Nov. 13, 1934.  W. SEVER  1,980,883
DEVICE FOR MEASURING THE LENGTHS OF FIBERS OR FILAMENTS
Filed Oct. 6, 1932
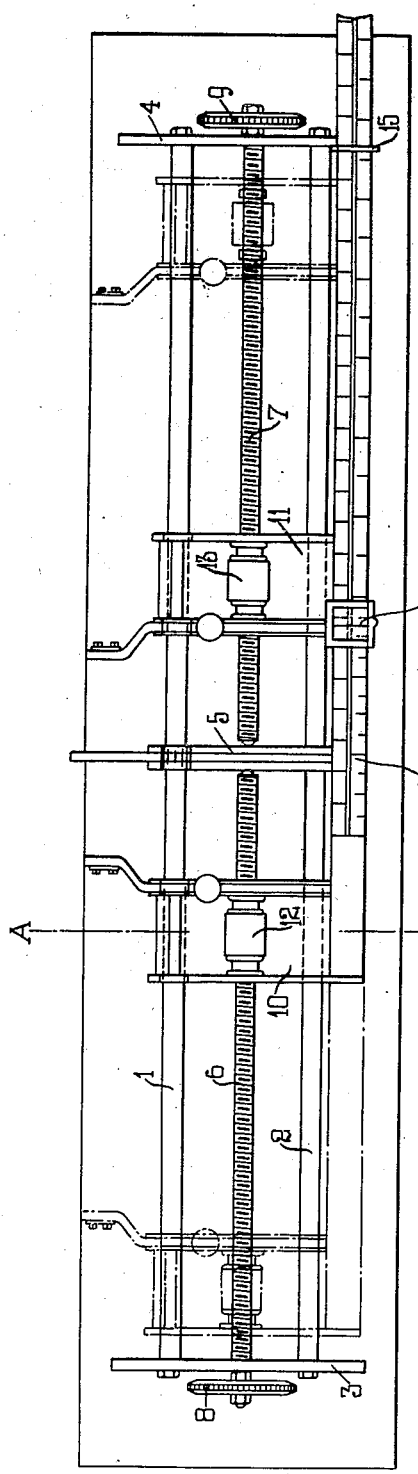
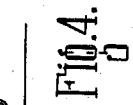
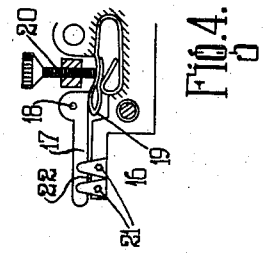
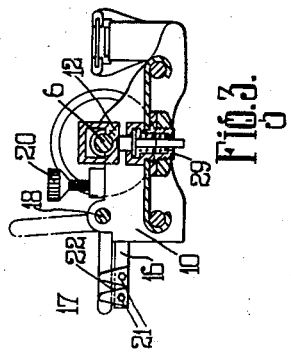
INVENTOR
William Sever
BY
Sturtevant, Mason & Porter
ATTORNEYS Patented Nov. 13, 1934

1,980,883

UNITED STATES PATENT OFFICE 1,980,883

DEVICE FOR MEASURING THE LENGTHS OF FIBERS OR FILAMENTS

William Sever, Bramhope, near Leeds, England

Application October 6, 1932, Serial No. 636,592
In Great Britain October 6, 1931

9 Claims. (Cl. 33—125)

This invention relates to a new or improved method and apparatus for measuring the length of filamentous articles. By this expression is meant all such fibers or filaments whose length or average length may be required to be accurately known.

It finds special application in the textile industry where it is necessary to make accurate determinations of the lengths of fibers of, for example wool, cotton, flax and other materials. The use of the device, however, is not limited to the textile industry since it can be successfully employed for measuring the lengths of any fibers or filaments, for example of asbestos, hair or other materials. With delicate fibers, for example of wool, it has hitherto been customary to make determinations of the length by methods involving the weighing of a certain number of fibers and a determination of the average diameter. This method presents disadvantages in practice and it is desirable to find a method which will enable the length of the individual fibers to be directly determined.

One object of the present invention is to enable fibers or filaments to be measured individually instead of statistically. A further object is to obtain a statistical measure of the average length of the fibers or filaments in a simple but individual measurement of a number of fibers or filaments selected at random. A further object is to enable the direct determination to be made of the true length of an individual fiber or filament when it is straightened to its full natural length substantially without stretching. A still further object of the invention is to enable the length of a fiber or filament to be determined when any natural curl or crinkle has been removed but the fiber or filament is still substantially unstretched. These and other objects are accomplished by making use of the method and apparatus which are described hereinafter and defined more particularly in the appended claims.

In the present invention the length of a filamentous article is determined by holding such article firmly at a point intermediate of its ends, gripping it with loose-holding devices at opposite sides of such point sufficiently loosely to allow slippage but sufficiently firmly to permit said article to be straightened to its full natural length substantially without stretching, then progressing said loose-holding devices towards the ends of said object until said object is just released therefrom and finally determining the distance apart of said loose-holding devices. The distance apart of the loose-holding devices when they have been progressed to the ends of the fiber or filament so that this is just released therefrom is a measure of the length of the filament. The loose-holding device may consist of finger-like members which grip the fiber or filament between them and preferably the pressure to which the fiber or filament is subjected by the loose-holding device is adapted to be regulated in accordance with the extensibility and curl of the fiber or filament. It is important that a sufficient tension should be applied to the fiber or filament substantially to eliminate the curl or crinkle so as to obtain an accurate linear measurement. At the same time it is important to avoid stretching the fiber or filament. Some materials are somewhat extensible and erroneous results would be obtained if the fiber or filament were subjected to undue tension during the progress of the loose-holding devices thereupon.

The apparatus according to the present invention consists of a frame having a firm holding device for holding a filament or fiber, loose-holding devices on opposite sides of said firm-holding device, means for progressing the loose-holding devices and means for determining the distance between said loose-holding devices when the fiber or filament is released therefrom. The firm-holding device, as well as the loose-holding device, may consist of a pair of finger-like members adapted to be pressed together and upon the fiber or filament by spring means which may be adjustable in the case of the loose-holding devices to control the pressure applied to the fiber or filament. The loose holding devices may be carried by carriages, movable on the frame and connected by threaded members to threaded shafts adapted, upon rotation, to progress the carriages together with the loose-holding devices with reference to the frame and to the firm-holding device which is preferably fixedly secured to the frame. The threaded members associated with the carriages are preferably disconnectible from the threaded shaft to enable the carriages to be displaced rapidly if desired. For measuring the distance apart of the loose-holding devices when the fiber or filament is released therefrom, a measuring scale is provided from which this distance can be correctly determined. Preferably one carriage carries the measuring scale while the other carriage carries an indicator member preferably a transparent cursor adapted to move adjacent to the measuring scale.

A preferred form of apparatus according to the present invention is illustrated in the accompanying drawing in which:

Figure 1 is a plan view,

Figure 2 is an end view,

Figure 3 is a section on the line A—A of Figure 1,

Figure 4 is a view of the interior of a part of the left hand carriage showing the adjusting means for controlling the pressure of the loose-holding devices.

As shown in the drawing, the frame comprises a pair of slide rods 1 and 2 which are preferably of brass, secured to end plates 3 and 4 which may be of steel. At approximately the mid-points of the slide rods 1 and 2 there is secured a firm-holding device 5. Above and between the slide rods 1 and 2 are provided a pair of threaded shafts 6 and 7. One of these is provided with a right hand thread, while the other is provided with a left hand thread. These threaded shafts are rotatably supported by the end walls 3 and 4 and by the firm-holding device 5. Knobs 8 and 9 are provided at the outer ends by means of which the threaded shafts may be rotated.

The carriages 10 and 11 of the loose-holding devices ride upon the slide rods 1 and 2 and respectively upon the threaded shafts 6 and 7. They are normally held in engagement with the shafts 6 and 7 by half-nut devices 12 and 13 which are adapted, upon depression, to be disconnected from the threaded shafts. The carriage 10 carries a graduated scale 14 which is also supported by passing through a flat eye 15 secured to the end plate 4. The carriage 11 carries a transparent cursor 23 having the usual hair line over the scale 14. The carriages 10 and 11 as well as the member 5 carry finger-like members whose construction is more clearly shown in Figures 3 and 4.

Referring now to Figure 4 a lower finger-like member 16 is fixedly secured to the carriage 10 and an upper finger 17 is rotatably secured to the carriage 10 by a pin 18 so that it may, when required, be brought into the position shown by the dotted lines (Fig. 3). The spring means for pressing the finger 17 into contact with the finger 16 are shown in Figure 4 in which a spring 19 formed into suitable convolutions, is housed in a recess behind and beneath the finger 17. A screw 20 is provided to enable the pressure between the fingers 17 and 16 to be varied as desired. When the screw 20 is pressed sufficiently far down, the only pressure between the fingers 16 and 17 is provided by the weight of the finger 17 and this may suffice when dealing with certain very delicate fibers. The finger 16 is provided with a pair of guides 21 between which the fiber to be measured may be laid and on its upper face there is preferably provided a small pad 22 of soft material such as rubber by which the fiber or filament may be frictionally gripped. The upper finger 17 may present a smooth metallic face to the fiber or filament.

It will be understood that the loose-holding device 11 is provided with a similarly arranged pair of fingers as is also the firm-holding device 5, but in the latter case it is not necessary to provide mechanism such as the screw 20 to enable the pressure between the fingers to be adjusted.

The half-nut devices 12 and 13 by which the carriages 10 and 11 are connected to the threaded rods 6 and 7 respectively are adapted to be depressed against a spring 29 to disconnect the carriages from the threaded shafts.

The apparatus illustrated in the drawing is used as follows for measuring the length of a fiber, for example a fiber of silk or wool. The carriages 10 and 11 which will be normally in the positions shown by the dotted lines on Figure 1, i. e. adjacent to the ends of the frame, may be moved to a suitable distance from the fixed holding device 5 for the length of the fiber in question. This movement may readily be made by depressing the half-nut members 12 and 13 and sliding the carriages inwardly. The upper fingers 17 of the three holding devices are now raised and the fiber to be measured carefully laid so that it is supported upon the three lower fingers 16 and rests between the guides 21 on the loose-holding devices and upon the bed of the soft material 22 which is on the lower members 16 of all three devices. The upper fingers 17 are then allowed to fall and grip the fiber at three points. The loose-holding devices are then separately progressed away from the firm-holding device by appropriate rotation of the knobs 8 and 9 until the fiber is seen to have straightened out. The screws 20 are then adjusted until there is the appropriate tension in the loose-holding device just to remove the crinkle or curl from the filament while allowing it to slide freely between the fingers without undue extension. The loose-holding devices are then progressed a little further and the upper finger of the firm holding device raised momentarily to allow the fiber to align itself. The loose-holding device 10 is then carefully progressed by rotation of the knob 8 until a sudden slackening of the fiber or filament shows that the loose-holding device has reached the end and the filament has been released. The loose-holding device 11 is then similarly carefully progressed until slackening of the filament again shows that the end has been reached. At the moment of release of the filament the movement of the loose-holding device is, of course, stopped and when the filament has been released from both of them its length can be directly measured in the scale 14 by means of a hair line on the cursor 23.

In constructing the instrument the scale and cursor are so secured to the carriages 10 and 11 respectively that the position of the hair line over the graduated scale gives a direct indication of the length of the filament which has been measured. To secure this result calibration of the instrument after its construction is desirable. To effect such calibration a filament, whose length has first been determined in any suitable way, is measured by the instrument and the reading given by the position of the hair line is then compared with the known true length. If the reading differs from the known true length the position of the scale 14 in relation to the carriage 10 or of the cursor 23 in relation to the carriage 11 is adjusted so that the hair line occupies a position over the scale which corresponds to the known true length. The instrument will then give a true indication of the length of other filaments which may be measured thereby.

It will be apparent that modifications may be made in the construction of the apparatus within the scope of the invention. Thus other means than the threaded shaft may be provided for progressing the loose-holding devices 10 and 11 apart. When the length of the fiber permits and the operator becomes more skilled, the operation may be rendered more rapid by disengaging the loose-holding carriages from the progressing means and moving them outwards until they reach almost the ends of the fibers so that only the last portion of their progression need be done slowly by means of the progressing mechanism.

As shown in Figure 4 of the drawing, the rear ends of the movable finger members 17 may be suitably conformed to enable them to be held in the upright position (to enable the fiber or filament to be placed in position) by the same spring means which provide pressure upon the fiber or filament. The portion of the upper finger which presses upon the filament may be rounded or of knife edge construction and may be of non-corrodible material. While there is indicated a pad 22 of soft material such as rubber, other contiguous surfaces may be provided such as glass and velvet to enable the gripping fingers of the loose-holding devices to slide over the fiber or filament. The fingers of the firm-holding device will usually be arranged to provide greater pressure upon the filament so as to prevent slip.

The measuring scale may be graduated in any appropriate units of length as, for example centimeters and inches together with convenient fractions thereof. As already stated, it may be initially calibrated by measuring the length of a filament whose length can be directly determined by other means or by directly measuring the distances between the gripping portions of the fingers and the loose-holding devices.

The filaments may be placed in position by means of tweezers or the like or in some cases by means of a 2-prong fork whose prongs are widely spaced and are tipped or covered with velvet. Fibers of wool, for example, readily adhere to velvet and by this means they may be readily picked up without being actually gripped.

I declare that what I claim is:—

1. Apparatus for determining the length of filamentous articles comprising a frame, a firm-holding device on said frame for holding a filamentous article at a point intermediate of its ends, loose-holding devices having adjustable spring means for holding said filamentous article sufficiently firmly to permit straightening substantially without stretching but to allow slippage, said loose-holding devices being mounted on opposite sides of said firm-holding device, means for progressing said loose-holding devices away from said firm-holding device and means for ascertaining the distance apart of said loose-holding devices.

2. Apparatus for determining the length of filamentous articles comprising a frame, a firm-holding device on said frame for holding a filamentous article at a point intermediate of its ends, loose-holding device adapted to loosely grip said filamentous article and movably mounted on said frame on opposite sides of said firm-holding device, means for separately progressing said loose-holding devices apart and means for ascertaining the distance apart of said loose-holding devices.

3. Apparatus as claimed in claim 2 in which said firm-holding device comprises a pair of finger-like members and spring means adapted to press said members together.

4. Apparatus as claimed in claim 1 in which said firm-holding device comprises a pair of finger-like members and spring means adapted to press said members together.

5. Apparatus for determining the length of filamentous articles comprising a frame, a firm-holding device on said frame for holding a filamentous article at a point intermediate of its ends, loose-holding devices adapted to hold said filamentous article sufficiently firmly to permit straightening substantially without stretching but to allow slippage, carriages supporting said loose-holding devices, rotatable shafts in threaded engagement with said loose-holding devices, means for rotating said shafts to move said loose-holding devices away from said firm-holding device and means for determining the distance apart of said loose-holding devices.

6. Apparatus as claimed in claim 5 in which said carriages are disengageable from said rotatable shafts to enable said carriages to be displaced rapidly.

7. Apparatus for determining the length of filamentous articles having a frame comprising parallel slide bars connected together at their ends and at a point intermediate of their ends by end members and a midmember respectively, two oppositely threaded shafts aligned between said mid-member and respective end members, means for independently rotating said shafts, a firm-holding device secured to said mid-member and comprising a pair of finger-like members having spring means pressing said fingers together, a pair of carriages detachably connected to said threaded shafts and riding on said slides, a measuring scale carried by one carriage, a cursor associated with said measuring scale and carried by the other carriage, loose holding devices secured to said carriages comprising finger-like members having spring means pressing said fingers together and means for adjusting said spring pressing means associated with said loose-holding devices.

8. Apparatus as claimed in claim 1 in which the means for determining the distance apart of said loose-holding devices comprises a measuring scale rigidly connected to one loose-holding device and a cursor member rigidly connected to the other loose-holding device and associated with said measuring scale.

9. Apparatus as claimed in claim 5 in which the means for determining the distance apart of said loose-holding devices comprises a measuring scale rigidly connected to one loose-holding device and a cursor member rigidly connected to the other loose-holding device and associated with said measuring scale.

WILLIAM SEVER.